(12) United States Patent
Kobrin et al.

(10) Patent No.: US 7,256,943 B1
(45) Date of Patent: Aug. 14, 2007

(54) VARIABLE FOCUS LIQUID-FILLED LENS USING POLYPHENYL ETHERS

(75) Inventors: Paul H. Kobrin, Newbury Park, CA (US); Alan B. Harker, Newbury Park, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 11/509,394

(22) Filed: Aug. 24, 2006

(51) Int. Cl.
*G02B 3/12* (2006.01)
(52) U.S. Cl. ..................................... 359/666
(58) Field of Classification Search ............... 359/665, 359/666
See application file for complete search history.

(56) References Cited

FOREIGN PATENT DOCUMENTS

WO    WO 2006/009514 A1    1/2006
WO    WO 2006009514 A1     1/2006

OTHER PUBLICATIONS

Sugiura et al.: "Variable-Focus Liquid-Filled Optical Lens"; Applied Optics: vol. 32: 1993: pp. 4181-4186.
Zhang et al.: "Fluidic Adaptive Lens With High Focal Length Tunability": Applied Physics Letters: vol. 82. No. 19: 2003: pp. 3171-3172.
N. Chronis et al.: "Tunable Liquid-Filled Microlens Array Integrated With Microfluidic Network": Optics Express: vol. 11: No. 19: Sep. 22, 2003: pp. 2370-2378.
J. Chen et al.: "Variable-Focusing Microlens With Microfluidic Chip": J. Micromech. Microeng. 14: 2004: pp. 675-680.
M. Agarwal et al.: "Polymer-Based Variable Focal Length Microlens System": J. Micromech. Microeng. 14: 2004: pp. 1665-1673.
J. Lee et al.: "Surface Modification of Poly (Dimethylsiloxane) for Retarding Swelling in Organic Solvents": Langmuir 2006: vol. 22: pp. 2090-2095.
R. A. Gunasekaran et al.: "Design and Fabrication of Fluid Controlled Dynamic Optical Lens System".: Optics and Laser in Engineering: vol. 42: 2005: pp. 686-703.
SL-5267 Optical Fluid Data Sheet: pp. 1-4.
SL-5262 Optical Fluid Data Sheet: pp. 1-4.
Sugiura & Morita, "Variable-focus liquid-filled optical lens," Applied Optics, vol. 32, No. 22, pp. 4181-4186, Aug. 1, 1993.
Zhang, et al, "Fluidic adaptive lens with high focal length tunability," Applied Physics Letters, vol. 82, No. 19, pp. 3171-3172, May 12, 2003.
Chronis, N. et al, "Tunable liquid-filled microlens array integrated with microfluidic network," Optics Express, vol. 11, No. 19, pp. 2370-2378, Sep. 22, 2003.
Chen, J. et al, "Variable-focusing microlens with microfluidic chip," Journal of Micromechanics & Microengineering, 14, pp. 675-680, 2004.
Agarwal, M. et al, "Polymer-based variable focal length microlens system," Journal of Micromechanics & Microengineering, 14, pp. 1665-1673, 2004.

(Continued)

*Primary Examiner*—Scott J. Sugarman
*Assistant Examiner*—Darryl J. Collins
(74) *Attorney, Agent, or Firm*—Koppel, Patrick, Heybl & Dawson (57) ABSTRACT

A variable focus liquid-filled lens or microlens array is formed with an elastomer membrane and filled with a polyphenyl ether (PPE) liquid. PPE provides approximately twice the refractive power of water and exhibits better absorption/evaporation properties than water.

20 Claims, 6 Drawing Sheets

OTHER PUBLICATIONS

Lee, J. et al, "Surface Modification of Poly (dimethylsiloxane) for Retarding Swelling In Organic Solvents," Langmuir 2006, American Chemical Society, pp. 2090-2095.

Gunasekaran, R.A. et al, "Design and fabricatin of fluid controlled dynamic optical lens system," Optics and Lasers in Engineering 43, 2005, pp. 686-703.

SL-5267 Optical Fluid Data Sheet.

SL-5262 Optical Fluid Data Sheet.

FIG.2

|  | WATER | SL-5262 | SL-5267 |
|---|---|---|---|
| RI AT 589 nm | 1.33 | 1.62 | 1.67 |
| ABSORPTION INTO MEMBRANE | LOW | LOW | LOW |
| EVAPORATION | 100% FEW MINUTES 100C, 0.4% HOUR AT 23C | 0.1% IN 24 HOURS 100C | 0.1% IN 24 HOURS 100C |
| VISCOSITY (23C) | 1 cP | 650 cP | 100cP |
| DENSITY (gm/cm3) | 1.0 | 1.2 | 1.2 |
| ABBE NUMBER | 53 |  | 26 |
| HUMAN TOXICITY | NO | NO | NO |

VARIABLE FOCUS LIQUID-FILLED LENS USING POLYPHENYL ETHERS

GOVERNMENTAL RIGHTS

This invention was made with Government support under Contract No. HR0011-04-C-0042 awarded by DARPA. The Government has certain rights in this invention.

BACKGROUND OF THE INVENTION

1. Field of the Invention

This invention relates to variable focus liquid-filled lenses and more specifically to polyphenyl ethers (PPE) that exhibit a high refractive index and low evaporation.

2. Description of the Related Art

Variable focal length lenses and microlens arrays are essential components for the next generation of consumer products such as mobile phones, security cameras, instrumentation, diagnostic equipment, imaging and optical communications. Dynamic tunability over a wide field-of-view (FOV) with minimal optical distortion is desired. One approach uses a liquid crystal cell to provide variable focal length when an external electric field is applied. These LC lenses are limited to small sizes, exhibit high optical distortion, slow response times and can provide a relatively small range of tunability. Another approach known as "electrowetting" applies a voltage across a drop of conductive fluid, which serves as a lens, to change the curvature of the drop, hence the focal length of the lens. This approach requires high voltages, is limited to small lens sizes and is highly susceptible to evaporation of the fluid.

An alternative approach was proposed by Sugiura et al. "Variable-focus liquid-filled optical lens," Appl. Opt. 32, 4181, (1993) and Zhang et al. "Fluidic adaptive lens with high focal length tunability," Appl. Phys. Lett. 82 (19), 3171-3172 (2003). They fabricated centimeter-scale liquid-filled optical lenses. Sugiura used an O-ring spacer to deform the elastic film and control lens focus. Zhang uses a syringe pump to inject fluid into the lens to control focus. The performance of these lenses is strongly influenced by the weight of the liquid, which induces non-symmetrical deformation of the lens surface when the lens is placed on a non-horizontal plane.

Considerable efforts have been made to reduce the size of the pneumatically activated liquid-filled lens to form microlenses and microlens arrays with micro-pumps using conventional lithographic processing. See N. Chronis et al. "Tunable liquid-filled microlens array integrated with microfluidic network" 22 Sep. 2003, Vol. 11, No. 19, Optics Express, pp. 2370-2378, J. Chen et al. "Variable-focusing microlens with microfluidic chip" J. Micromech. Microeng. 14 (2004) pp. 675-680, M. Agarwal et al. "Polymer-based variable focal length microlens system" J. Micromech. Microeng. 14 (2004) pp. 1665-1673 and I. Fernandez, "Variable Focus Microlens" Int. Pub. No. WO 2006/009514. In general, a chamber or array of chambers is formed over a microfluidic network, filled with a liquid and covered with a flexible membrane. A pneumatic pump applies pressure to the microfluidic network to inflate or deflate the membrane to control the focal length of each microlens. The most common membrane material is polydimethyl-siloxane (PDMS), which is a silicone-based elastomer.

The refractive power of the microlens for a given curvature is determined by the difference in the refractive indices of the fluid and air at the lens interface. The effect of the thin membrane is negligible and can be ignored.

For a thin, symmetrical, double-sided lens, the focal length, f, is given by $1/f=2/r^*(n_f-1)$ where $n_f$ is the index of the fluid and r is the radius of curvature of the surfaces. To maximize the tuning range of the focal length f for a given capability to vary the lens radius it is desirable to have a fluid with a high index of refraction. This will also reduce the amount of spherical aberration for a given focal length.

In general, the known liquid-filled lenses and microlenses use water or distilled water (n=1.33 at a wavelength of 0.63 microns) as their standard solution and mention that any high refractive index liquid could be used. Sugiura used a dimethyl silicon oil. Chronis suggests using microscope immersion oil (n=1.41) or UV curable polymer (n=1.56) as the optical liquid. Fernandez states that the fluid preferably comprises a polar liquid such as water or polyhydric alcohols and has a high surface tension.

Unfortunately, the selection of a suitable optical liquid is not as simple as just selecting any liquid with a high refractive index. For example oils typically have a high viscosity, which is harder to pump through the microfluidic network thus putting greater demands on the micro-pump and increasing the response time of the lens. Lenses that use UV curable polymers must be shielded from UV light to avoid curing the polymer. Polyhydric alcohols will evaporate through the membrane quickly.

In addition to having a high refractive index, suitable optical liquids must be non-toxic to humans, low viscosity to flow through the microfluidic network, low absorption into the membrane to avoid wrinkling and degrading the lens surface, low evaporation out of the membrane, low density for larger lens sizes and low dispersion at the wavelengths of interest. The Abbe number ($v=(1-n_{589})/(n_{486}-n_{656})$), is a measure of dispersion in the visible band. The larger the Abbe number the less the dispersion. Water satisfies all of these criteria although it would be desirable to have a liquid with a higher refractive index and lower absorption/evaporation properties.

J. Lee et al. "Surface Modification of Poly(dimethylsiloxane) for Retarding Swelling in Organic Solvents", Langmuir 2006, 22, 2090-2095 describes a method of alleviating swelling problems of PDMS molds in organic solvents. Lee attempts to solve or at least mitigate the problems of absorption of the liquid in the fluidic lens into the membrane and evaporation therefrom by modifying the PDMS membrane material.

SUMMARY OF THE INVENTION

The present invention provides a variable focus liquid-filled lens or microlens array formed with an elastomer membrane filled with a polyphenyl ether (PPE) liquid. PPE exhibits a refractive index of at least 1.58 over the visible, near IR, and SWIR and can have sulfur substitutions (creating polyphenyl ether/thioethers) to provide even higher indices and lower viscosity at room temperature. PPE exhibits a low absorption into and evaporation out of the elastomer membrane. A non-phenylated silicone elastomer exhibits even lower absorption of the PPE liquid. PPE also satisfies the other criteria for the optical liquid. In particular, PPE's low density is important for centimeter size lenses and its low viscosity is important for use with microlenses. In addition, PPE exhibits the unexpected benefit of not forming air bubbles ("anti-nucleating") when the lens is placed under negative pressure to form a concave surface. The formation of bubbles severely degrades the optical performance of the liquid-filled lens. PPE does have the disadvantage of being fairly expensive, hence its low evaporation is even more important. In addition, PPE will react with and damage materials such as some plastics commonly used in the pneumatic pump actuators. Therefore the lens and actuator must be formed from PPE compatible materials such as metal, silicon, glass, fluorinated polymers and some epoxies.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a variable focus liquid-filled lens or microlens array formed with an elastomer membrane filled with a polyphenyl ether (PPE) liquid. PPE provides approximately twice the refractive power of water and exhibits better absorption/evaporation properties than water.

The use of PPE is generally applicable to any variable focus liquid-filled lens. The lens may be single or double-sided, centimeter or micro scale, and/or a single lens or an array of lenses. The lens may be formed from discrete optical components or using microfabrication techniques. The actuator for deforming the lens to adjust the focal length is typically pneumatic but may be mechanical or electrical. A pneumatic actuator may include a pump or some other device capable of moving fluid in and out of the liquid-filled lens. Pneumatic actuation is well-known in the relevant art.

Figures 1A, 1B:
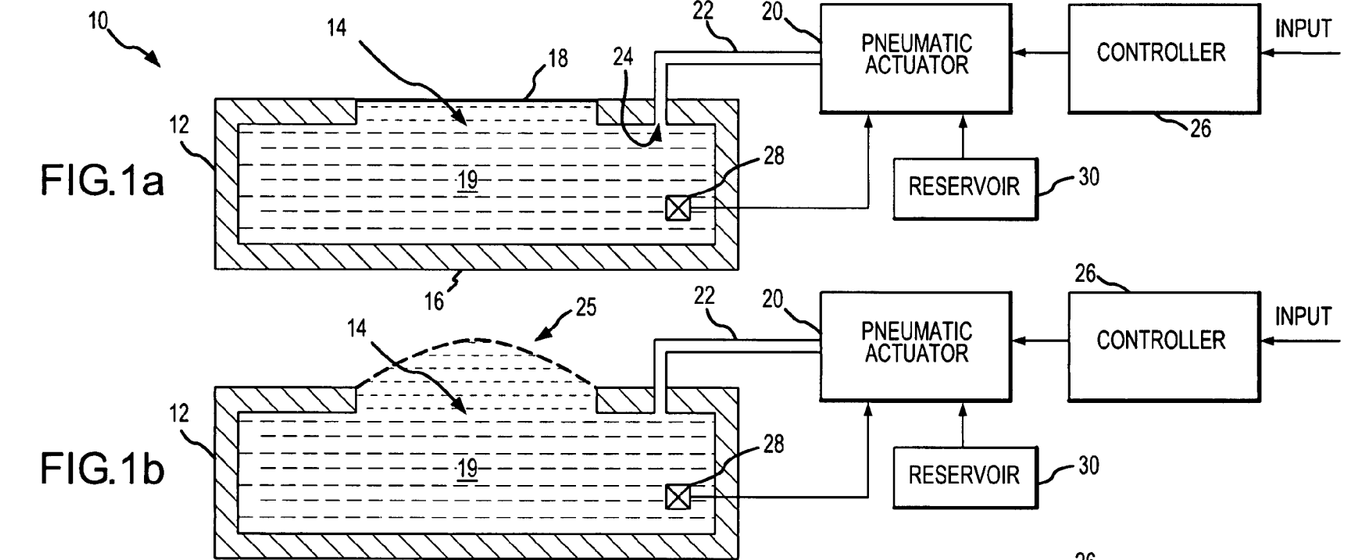
FIG. 1 is a diagram of a variable focus liquid-filled lens filled with PPE in accordance with the present invention.
Figure 1C:
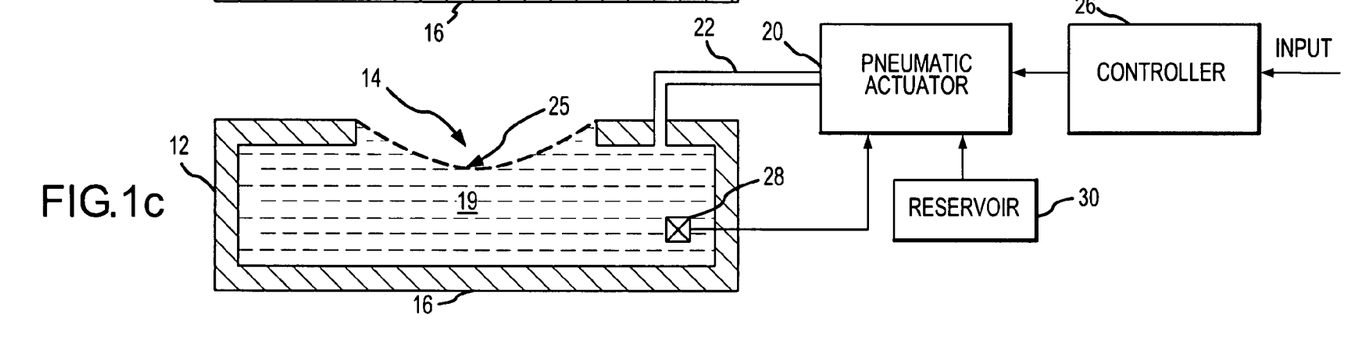

An exemplary single-sided variable focus liquid-filled lens 10 is illustrated in FIGS. 1a-1c. Lens 10 comprises a chamber 12 having an aperture opening 14. The bottom 16 of the chamber opposite aperture opening 14 must be transparent in the wavelength range, e.g. 0.4-0.7 microns in the visible, 0.7-0.9 in the Near IR and 0.9 to 1.7 in the Short-Wave IR. The chamber's aperture opening is covered with a thin elastomer membrane 18. The membrane may be pre-stressed in order to remain flat at zero pressure. The chamber is filled with a polyphenyl ether (PPE) liquid 19 to form the lens element 25 at the aperture opening. A pneumatic actuator 20 forces the liquid through a fluidic network 22 into and out of the chamber through an opening 24 to inflate and deflate the membrane 18 to adjust the focal length of the lens element 25.

In order to vary the focus in an accurate and controllable manner, an input command, e.g. a specific focal length or increase/decrease focal length, is provided to a controller 26. The controller converts the input command into an actuator command, e.g. a specific pressure or increase/decrease pressure. The pneumatic actuator responds by removing fluid from the chamber thereby reducing the positive pressure and deflating the membrane to increase the focal length of the convex lens 25 or forcing fluid into the chamber thereby increasing the positive pressure and inflating the membrane to reduce the focal length of the convex lens as shown in FIG. 1b. If the chamber is under negative pressure, removing more fluid will increase the negative pressure and reduce the focal length of the concave lens as shown in FIG. 1c. The anti-nucleating property of PPE is particular important when the lens is placed under negative pressure to form a convex surface. To ensure that the actual focal length tracks the input command, a pressure gauge 28 can be placed somewhere in the fluidic network, suitably in the chamber. The pressure is fed back to the pneumatic actuator to provide closed-loop control. Alternatively, the shape of the lens can be controlled by just controlling the volume that is pumped.

The lens or specifically the lens' fluidic system can either be an open or closed system. An "open" system means that the entire lens assembly or a portion of the fluidic system can have the PPE liquid replenished from an external source. A "closed" system means that the lens assembly is provided with an initial amount of PPE liquid and cannot be externally replenished. For example, as liquid is absorbed into the membrane and evaporates the chamber may need to be refilled. This can be accomplished with a reservoir 30 that has an extra supply of liquid to replenish the chamber. In an "open" system the lens assembly would have an opening that allows a user to refill the reservoir or the chamber. With a different type of actuator, e.g. mechanical or electrical, the chamber itself may be a closed system. In many of the anticipated applications for liquid-filled lenses, designing the system to allow a user to recharge the liquid and requiring the user to do so is undesirable. Furthermore, PPE liquids are relatively expensive.

Figure 2:
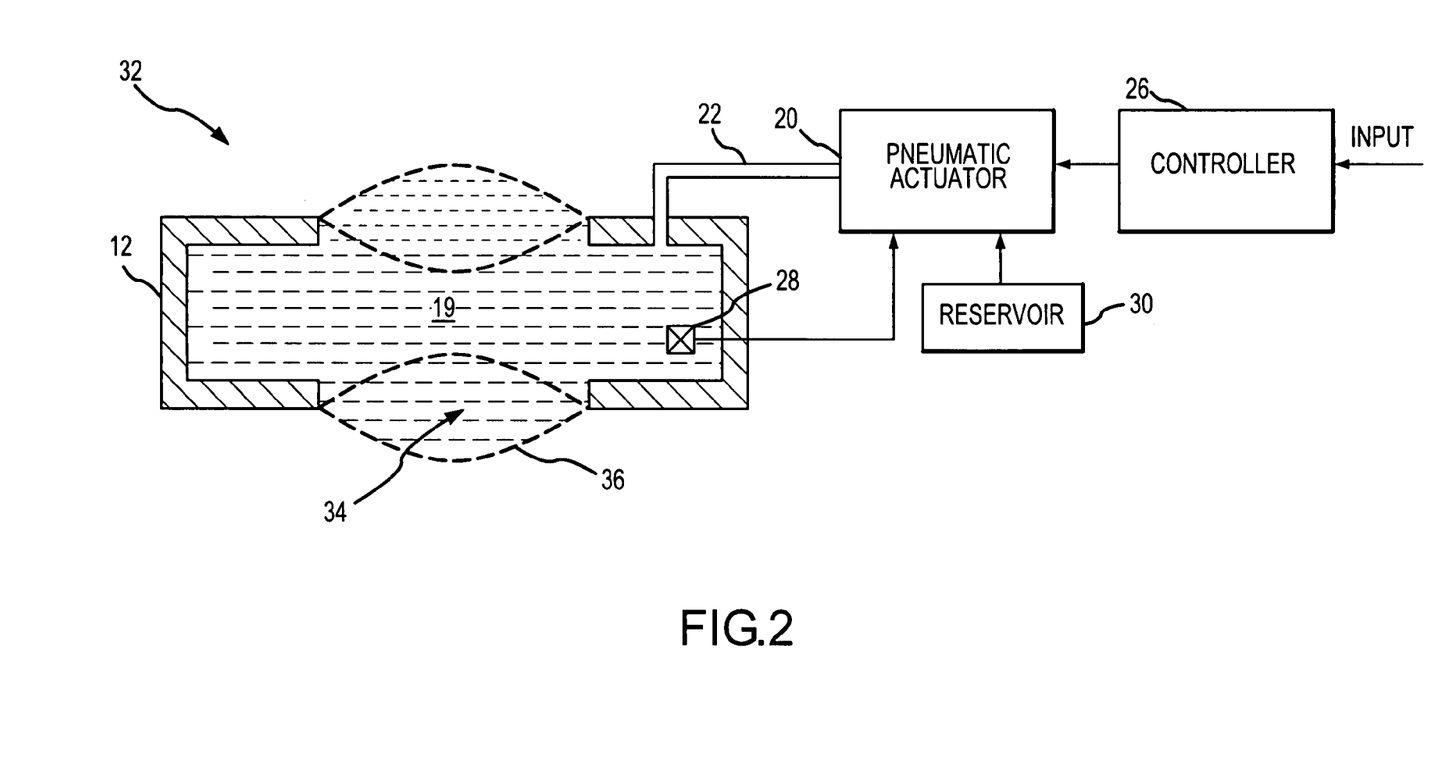
FIG. 2 is a diagram of a double-sided variable focus liquid-filled lens.

A double-sided variable focus liquid-filled lens 32 is shown in FIG. 2. This lens is identical to the single-sided lens except that a second aperture opening 34 is formed in the bottom of the chamber 12 and covered with a second thin elastomer membrane 36. Membranes 18 and 36 can be inflated to form a double-convex lens or deflated to form a double-concave lens.

Figure 3:
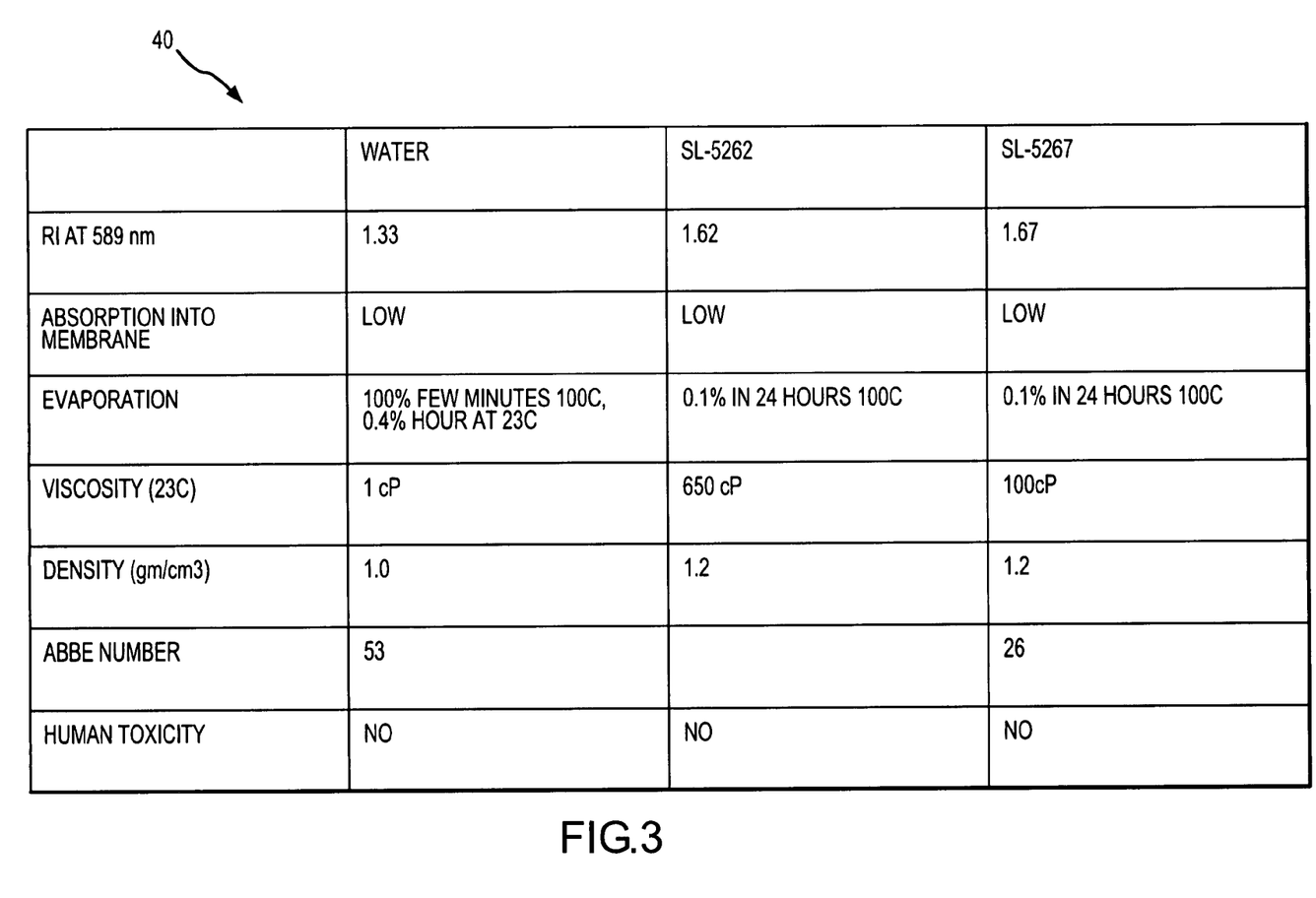
FIG. 3 is a table of properties of water, a PPE and a PPE with sulfur substitution.
Figure 4:
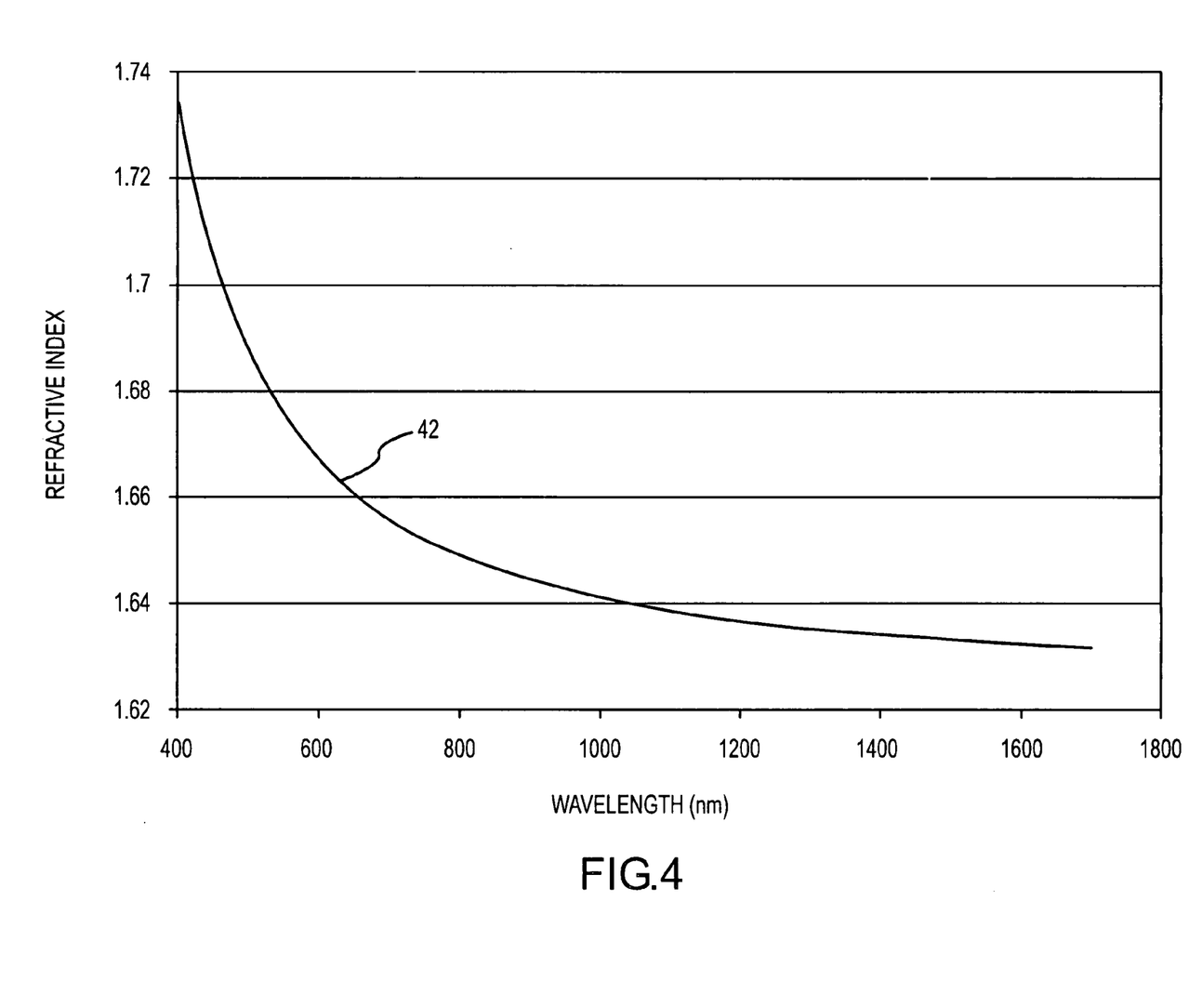
FIG. 4 is a plot of the refractive index of PPE with a sulfur additive versus wavelength.

As shown in table 40 of FIG. 3, a polyphenyl ether (SL-5262) or a polyphenyl ether/thioether (SL-5267) produced by Santovac® as index matching fluids or lubricants compare favorably with water in terms of refractive index and evaporation and are comparable to water in the other required properties. As shown in FIG. 4, the refractive index 42 of these PPEs provides approximately 2× the refractive power of water. The refractive index is at least 1.58 from the visible through the SWIR wavelengths. As a result, less curvature is required to achieve a given amount of refraction, hence less spherical aberration. Furthermore, the amount of evaporation even at highly elevated temperatures is negligible. 5-ring ethers have demonstrated the desired viscosity and evaporation.

Figure 5A:
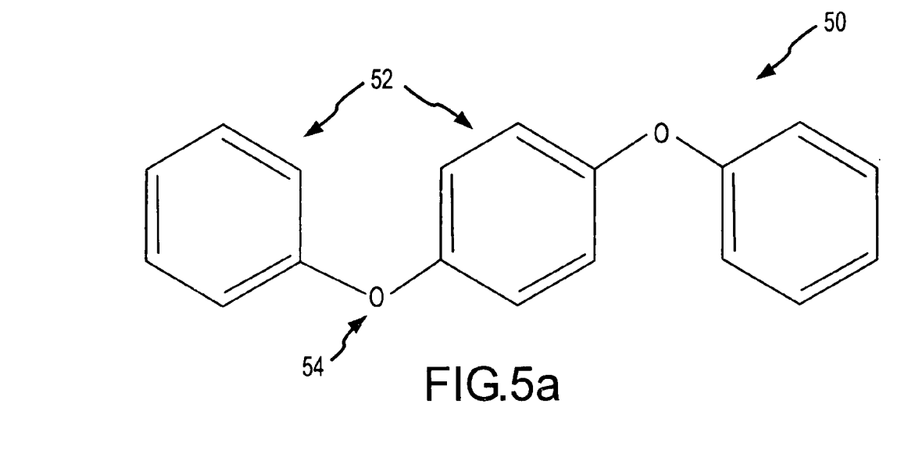
FIGS. 5a-5d are chemical compound diagrams of polyphenyl ether and its elements.
Figure 5B:
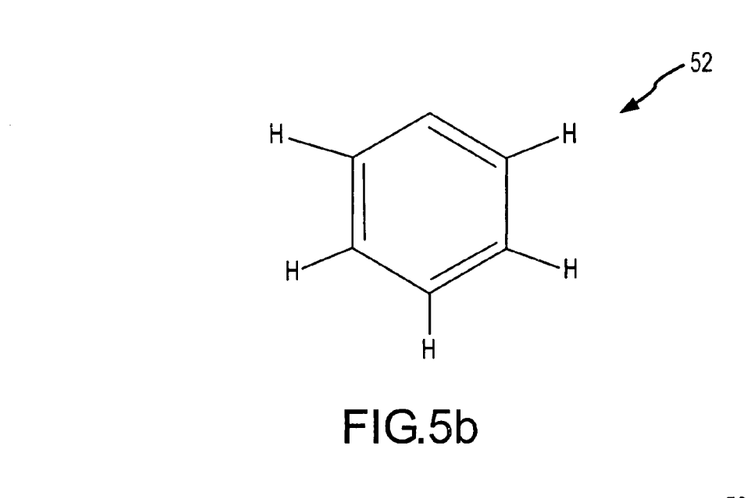
Figure 5C:
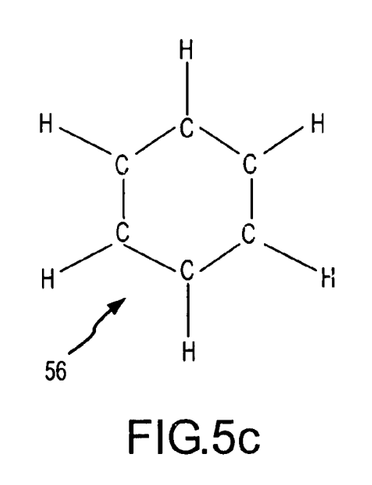
Figure 5D:
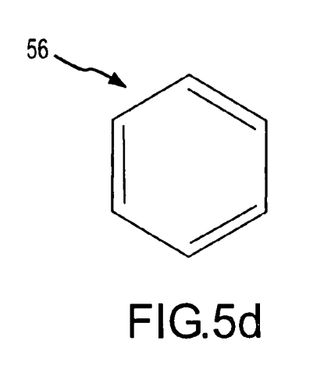

As shown in FIG. 5a, polyphenyl ethers 50 (PPE) are chemical compounds which contain 3 to 6 phenyl groups 52 (aromatic rings) that are bonded ("linked") to another via an oxygen atom "O" 54, e.g. $C_6H_5$—O—$C_6H_4$—O—$C_6H_4$—O— .... A phenyl group 52 is a benzene ring 56 with a missing hydrogen "H" atom (FIG. 5b). A benzene ring 56 is a ring made up of 6 carbon "C" atoms linked together with a single hydrogen atom attached to each carbon atom on the outside of the ring, e.g. $C_6H_6$ (FIG. 5c). To simplify the compound diagrams, the benzene ring 56 is typically shown as in FIG. 5d without the attached hydrogen atoms or enumerated carbon atoms. The chain lengths, branching and side phenyl groups give a particular PPE its unique properties.

The membrane elastomer is suitably a silicone elastomer. Other possible materials include fluoropolymers. Silicone elastomers are further classified by their functional groups: vinyl-, fluoro-, methyl-, or phenyl-. As PPE includes "phenyl groups", the elastomer is preferably a non-phenylated (aliphatic) elastomer. A phenylated elastomer would tend to more readily absorb the PPE, eventually causing swelling, wrinkling and eventually loss of elasticity. Polydimethylsiloxane (PDMS) is a non-phenylated silicone elastomer. Membrane thickness will depend on the size of the lens but typical thicknesses are in the tens of microns.

PPE will react with and damage materials such as some plastics commonly used in the pneumatic pump actuators. Therefore the lens, actuator and all parts of the "fluidic network" that come in contact with the PPE must be formed from PPE compatible materials such as metal, ceramic, glass, silicon, epoxy, fluoroelastomers, silicone, PTFE (otherwise know as Teflon), polyimide, polyetherimide, nylon, acetal, phenolic, and polyamide-imide.

Figure 6:
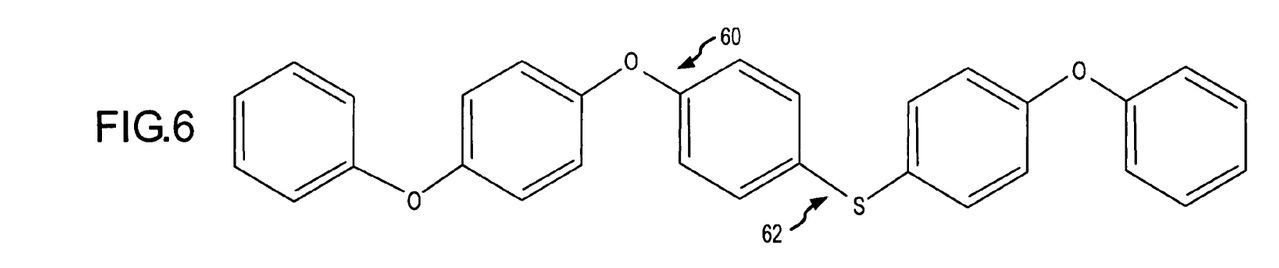
FIG. 6 is a chemical compound diagram of polyphenyl ether/thioether.

As shown in FIG. 6, a polyphenyl ether/thioether 60 has a combination of "O" and sulfur "S" linkages. A thioether is an ether where one or more of the oxygen linkages has been replaced by a sulfur atom 62. The sulfur atom is more polarizable than an oxygen atom, so a thioether will have a higher refractive index than the corresponding ether. The thioether will also have a lower viscosity. Typically the ether/thioether will contain 10% to 90% by weight of polyphenyl thioether with the remainder polyphenyl ether.

Figure 7:
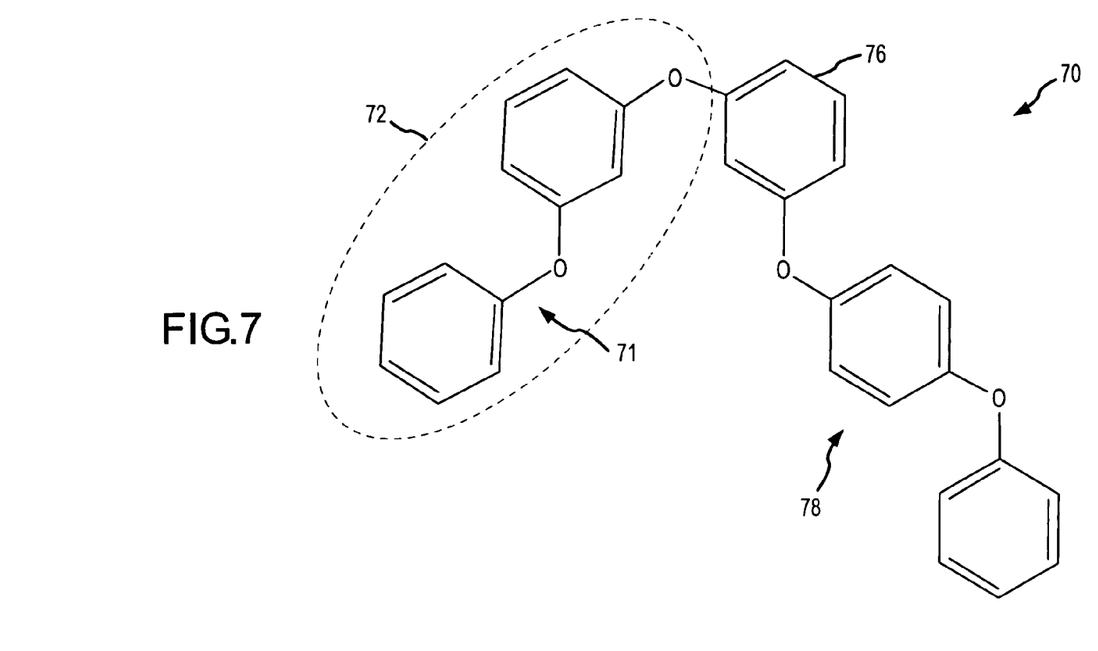
FIG. 7 is a chemical compound diagram of m-bis(m-phenoxyphenoxy)benzene.

As shown in FIG. 7, m-bis(m-phenoxyphenoxy)benzene 70, which is the chemical name for Santovac® 5P ULTRA POLYPHENYL ETHER LUBRICANT fluid, is a species of the generic polyphenyl ether 50 described above and similar to SL-5267. A phenoxy group 71 looks like a benzene ring with an O atom occupying the spot of the missing H atom. If a phenoxy group uses its oxygen atom to bond to a carbon atom in the ring of another phenoxy group, it forms a phenoxyphenoxy group 72. In turn, the phenoxyphenoxy group can substitute for a H atom on the parent benzene molecule 76. This would be called phenoxyphenoxybenzene.

In the chemical of interest, a second phenoxyphenoxy group 78 has substituted for a second H atom on the parent benzene molecule 76 to form bis(phenoxyphenoxy)benzene 70. The bis-prefix means two of the groups enclosed by parentheses are attached to the parent molecule. The m-stands for meta-, which means that the groups are separated from each other by a single carbon atom on the benzene ring. The chemical name m-bis(m-phenoxyphenoxy)benzene tells us that the compound consists of a parent benzene ring 76 with two phenoxyphenoxy groups 72, 78 attached to it. Described another way, it is a central 6-membered aromatic ring 76 linked as a bent chain to 4 other aromatic rings. Each aromatic ring in the chain is separated from the next by an intervening oxygen atom.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A variable focus liquid-filled lens, comprising:
   A chamber including at least one aperture opening;
   An elastomer membrane covering the chamber's aperture opening;
   A polyphenyl ether (PPE) liquid that fills the chamber to form a lens at the aperture opening; and
   An actuator that deforms the membrane to adjust the focal length of the lens.
2. The variable focus liquid-filled lens of claim 1, wherein the PPE has sulfur substitutions that create polyphenyl ether/thioethers.
3. The variable focus liquid-filled lens of claim 2, wherein the liquid is 10% to 90% by weight of polyphenyl thioether with the remainder polyphenyl ether.
4. The variable focus liquid-filled lens of claim 2, wherein the PPE liquid exhibits a refractive index of at least 1.58 over a wavelength range spanning 0.4 to 1.6 microns.
5. The variable focus liquid-filled lens of claim 1, wherein the PPE is a five ring polyphenyl ether or polyphenyl ether/thioether.
6. The variable focus liquid-filled lens of claim 1, wherein the membrane is a non-phenylated elastomer.
7. The variable focus liquid-filled lens of claim 6, wherein the membrane is a silicone elastomer.
8. The variable focus liquid-filled lens of claim 1, wherein the lens has a diameter of at least 0.2 cm, said PPE having a density of approximately 1.2 gm/cm3.
9. The variable focus liquid-filled lens of claim 1, wherein the actuator moves the PPE liquid in and out of the chamber through a fluidic network to deform the membrane, said PPE having a viscosity of at most 1000 cP at 23C.
10. The variable focus liquid-filled lens of claim 1, wherein the PPE evaporates at less than 1% in 24 hours at 100C.
11. The variable focus liquid-filled lens of claim 10, wherein the chamber is a closed system.
12. The variable focus liquid-filled lens of claim 10, further comprising a reservoir of PPE liquid for replenishing the chamber, said reservoir being a closed system.
13. The variable focus liquid-filled lens of claim 1, wherein the chamber includes a second aperture opening, further comprising a second membrane covering the second aperture to form a double-sided lens.
14. The variable focus liquid-filled lens of claim 1, wherein the actuator comprises a pneumatic actuator that forces PPE liquid into and out of the chamber to deform the membrane.
15. The variable focus liquid-filled lens of claim 1, wherein the chamber and actuator are formed from PPE compatible materials.
16. The variable focus liquid-filled lens of claim 15, wherein the PPE compatible materials are selected from metal, ceramic, glass, silicon, epoxy, fluoroelastomers, silicone, PTFE, polyimide, polyetherimide, nylon, acetal, phenolic, and polyamide-imide.
17. A variable focus liquid-filled lens, comprising:
   A chamber including at least one aperture opening;
   A non-phenylated silicone elastomer membrane covering the chamber's aperture opening;
   A liquid comprising by weight 10-90% polyphenyl ether (PPE) and 10-90% polyphenyl thioether that fills the chamber to form a lens at the aperture opening, said lens having a refractive index of at least 1.58 over a wavelength range spanning 0.4 to 1.6 microns; and

A pneumatic actuator that forces the liquid into and out of the chamber to inflate and deflate the membrane to adjust the focal length of the lens.

18. The variable focus liquid-filled lens of claim 17, wherein the PPE is a five ring polyphenyl ether/thioether.

19. The variable focus liquid-filled lens of claim 17, wherein the pneumatic actuator and chamber form a closed-system.

20. The variable focus liquid-filled lens of claim 17, wherein the chamber and actuator are formed from PPE compatible materials selected from metal, ceramic, glass, silicon, epoxy, fluoroelastomers, silicone, PTFE, polyimide, polyetherimide, nylon, acetal, phenolic, and polyamide-imide.

* * * * *